US008473768B2

(12) United States Patent
Kim et al.

(10) Patent No.: US 8,473,768 B2
(45) Date of Patent: Jun. 25, 2013

(54) POWER CONTROL APPARATUS AND METHOD FOR CLUSTER SYSTEM

(75) Inventors: Dae Won Kim, Daejeon (KR); Sun Wook Kim, Daejeon (KR); Won-Ok Kwon, Daejeon (KR); Seong Woon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 710 days.

(21) Appl. No.: 12/649,241

(22) Filed: Dec. 29, 2009

(65) Prior Publication Data
US 2011/0119514 A1  May 19, 2011

(30) Foreign Application Priority Data
Nov. 19, 2009  (KR) .................. 10-2009-0111903

(51) Int. Cl.
*G06F 1/30* (2006.01)
(52) U.S. Cl.
USPC ........................................................ 713/340
(58) Field of Classification Search
USPC ........................................ 713/320, 323, 324
See application file for complete search history.

(56) References Cited

U.S. PATENT DOCUMENTS

| 8,041,976 B2 * | 10/2011 | Kern et al. ............... 713/324 |
| 2008/0263375 A1 * | 10/2008 | Sundstrom et al. ....... 713/320 |
| 2009/0037162 A1 | 2/2009 | Gaither et al. |
| 2009/0055665 A1 | 2/2009 | Maglione et al. |
| 2009/0150693 A1 | 6/2009 | Kashyap et al. |
| 2009/0183016 A1 | 7/2009 | Chan et al. |

FOREIGN PATENT DOCUMENTS

| JP | H09-091254 | 4/1997 |
| KR | 10-2000-0065894 | 11/2000 |
| KR | 10-2009-0062107 | 6/2009 |

OTHER PUBLICATIONS

"CPU Miser: A Performance-Directed, Run-Time System for Power-Aware Clusters", Rong Ge et al., 2007 International Conference on Parallel Processing (ICPP 2007), 2007 IEEE.
"Power and Energy Management for Server Systems", Ricardo Bianchini et al., 2004 IEEE.
"Coordinating multiple autonomic managers to achieve specified power-performance tradeoffs", Jeffrey O. Kephart et al., 4th International Conference on Autonomic Computing (ICAC '07), 2007 IEEE.
Chinese Office Action and the English translation thereof.
Soo-Cheol Oh et al, "CPU Power Management on Cluster Systems", The 28th Korea Information Processing Society Fall Conference Journal vol. 14, No. 2, Nov. 2007.

* cited by examiner

*Primary Examiner* — Kim Huynh
*Assistant Examiner* — Austin Hicks
(74) *Attorney, Agent, or Firm* — Blakely, Sokoloff, Taylor & Zafman

(57) ABSTRACT

A power control apparatus for a cluster system, includes a cluster including a plurality of nodes, each equipped with a battery; and a power control unit connected to the cluster over a network and configured to monitor power management information and performance information of the cluster and to set a power capping threshold based on the monitored power management information and performance information of the cluster. Accordingly, the power control unit enables power of the cluster to be limited by turning on and off the batteries when power of the cluster system increases up to the power capping threshold.

18 Claims, 7 Drawing Sheets

POWER CONTROL APPARATUS AND METHOD FOR CLUSTER SYSTEM

CROSS-REFERENCE TO RELATED APPLICATION

The present invention claims priority of Korean Patent Application No. 10-2009-0111903, filed on Nov. 19, 2009, which is incorporated herein by reference.

FIELD OF THE INVENTION

The present invention relates generally to technology for controlling power for a cluster system; and, more particularly, to a power control apparatus and method for a cluster system, which are suitable for managing the power of all data centers by differently limiting power for systems, each equipped with an Advanced Configuration and Power Interface (ACPI), a power monitoring function, and a controllable battery, e.g., an Uninterruptible Power Supply (UPS).

BACKGROUND OF THE INVENTION

Recently, as a large number of data centers have been being operated all over the world by Internet portable service companies, each having an Internet Data Center (IDC) which is operating hundreds of thousands of devices, technologies for efficiently managing the power of data centers has been multilaterally conducted.

In particular, with the recent information technology infrastructure becoming extended, the power consumption of IDCs has been increased rapidly at an annual average rate of about 45% for three years, and is expected to increase up to 1510 million kWh this year. In order to reduce the rapidly increasing power consumption of IDCs, IDC-level power management technology has been being emphasized.

In a cluster system, there is a plurality of methods of powering down a server, the availability of which decreases in an actual system, or converting the server into a hibernation state. However, in this case, the complexity required to return the server to original state thereof increases, and more functions of managing such an operation are required, and thus the efficiency of the cluster system may decrease.

In consideration of this fact, conventional technologies, such as technology for controlling power using an Intelligent Platform Management Interface (IPMI) and an ACPI, power management technology based on a power model using monitored data, and technology for migrating a data center to a server having low availability by monitoring a load in the data center, have been proposed.

However, such conventional technology is problematic in that the power of the server (or terminal) of a cluster system, e.g., an IDC, always needs to be turned on, and it is difficult to actively cope with the availability of the system.

SUMMARY OF THE INVENTION

In view of the above, the present invention provides a technology for controlling power for a cluster system, in which a battery is mounted in the power supply unit of the cluster system and is monitored and controlled in real time, thus reducing power consumption and actively coping with the availability of the cluster system.

To be more specific, the present invention provides a power control apparatus and method for a cluster system, which set a power capping threshold by monitoring in real time the power, i.e., power consumption and the amount of use of servers, and which enable the cluster system to be automatically controlled such that, when actual amount of the used power is not less than the power capping threshold, power consumption is prevented from exceeding the power capping threshold by changing frequency using Dynamic Voltage and Frequency Scaling (DVFS), changing the state of an ACPI, and utilizing a battery control system.

Further, the present invention provides a power control apparatus and method for a cluster system, which automatically set a power capping threshold by monitoring in real time the power and the amount of use of servers, and reduce the power to be supplied by operating the batteries of servers in ascending order of the amount of use of servers according to the amount of use of the servers for a preset period of time when the amount of the power reaches the power capping threshold.

In accordance with a first aspect of the present invention, there is provided a power control apparatus for a cluster system, including: a cluster including a plurality of nodes, each equipped with a battery; and a power control unit connected to the cluster over a network and configured to monitor power management information and performance information of the cluster and to set a power capping threshold based on the monitored power management information and performance information of the cluster, thus enabling power of the cluster to be limited by turning on and off the batteries when power of the cluster system increases up to the power capping threshold.

In accordance with a second aspect of the present invention, there is provided a power control method for a cluster system, including: monitoring power management information and performance information of a cluster over a network; arranging the monitored power management information and performance information of the cluster into a database; analyzing and optimizing the power management information and the performance information of the cluster, which are arranged into the database; determining a power cap value of the cluster based on results of the analysis and optimization; and executing power capping mode for the cluster according to the determined power cap value.

In accordance with an embodiment of the present invention, unlike conventional power control technology using an ACPI and a CPU control function, power consumption can be further reduced using a power control apparatus equipped with a battery. Further, the present invention can minimize the occurrence of the problems of conventional systems, that is, the problem of power being turned off when an ACPI is operating or the problem of performance decreasing due to a CPU control function, for example, Dynamic Voltage and Frequency Scaling (DVFS), and can perform dynamic power control based on power values that are monitored in real time according to preset power.

DETAILED DESCRIPTION OF THE EMBODIMENTS

Hereinafter, embodiments of the present invention will be described in detail with reference to the accompanying drawings which form a part hereof.

Figure 1:
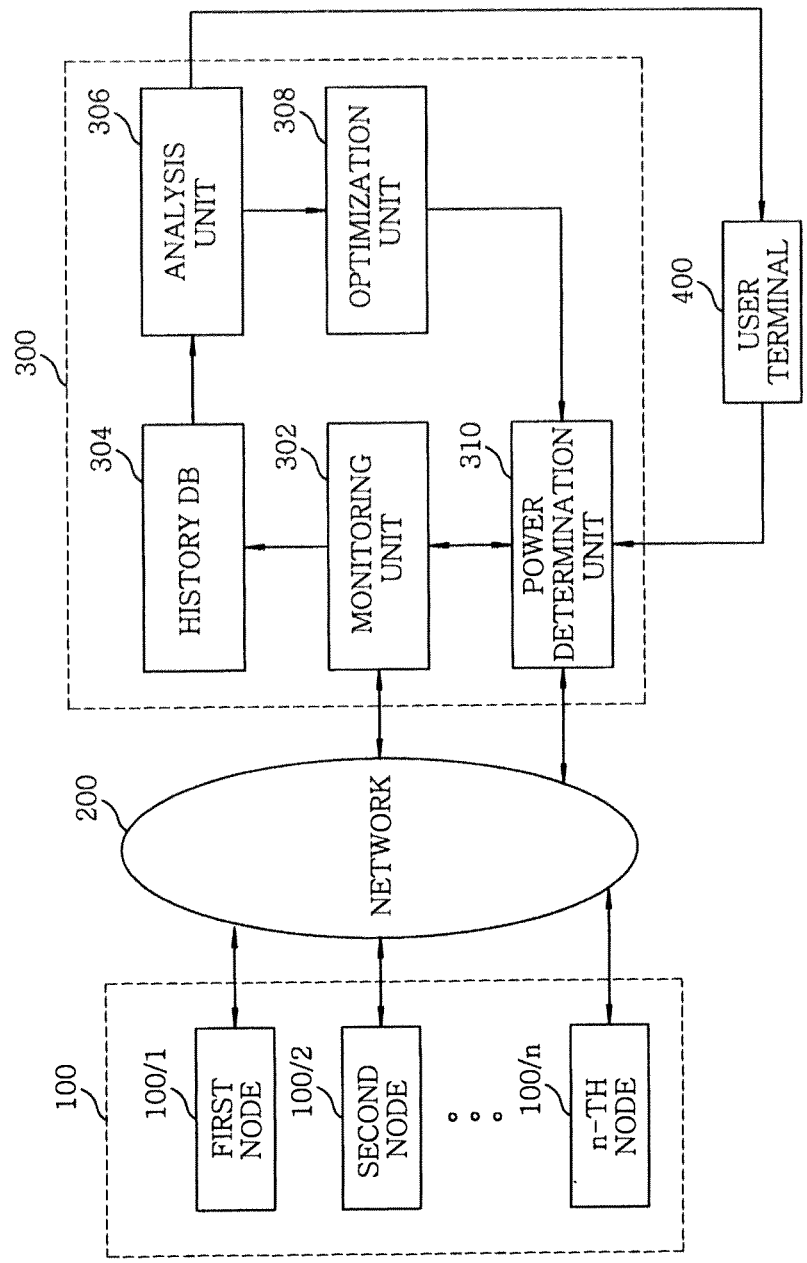
FIG. 1 is a block diagram showing the construction of a power control apparatus for a cluster system in accordance with an embodiment of the present invention.

FIG. 1 is a diagram showing the construction of a power control apparatus for a cluster system in accordance with an embodiment of the present invention. The power control apparatus includes a cluster 100, a network 200, a power control unit 300 and a user terminal 400.

As shown in FIG. 1, the cluster 100 includes a plurality of nodes 100/1 to 100/n and is connected to the power control unit 300 via the network 200. Each node in the cluster 100 will be described in detail with reference to FIG. 2.

Figure 2:
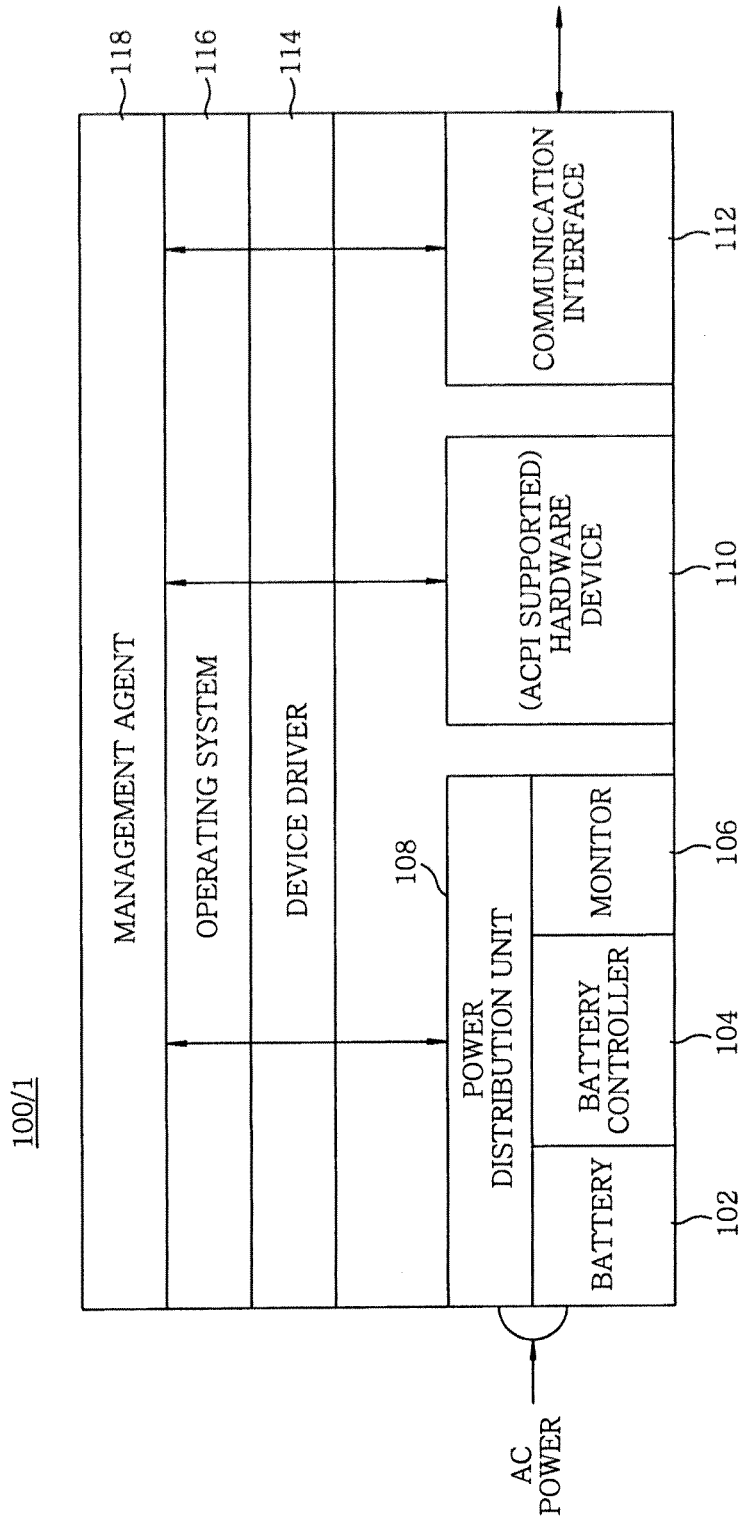
FIG. 2 is a block diagram showing the detailed construction of a certain node of the cluster of FIG. 1, e.g., a first node.

FIG. 2 is a block diagram showing the detailed construction of a certain node in the cluster 100, e.g., a first node 100/1. The first node 100/1 includes a battery 102, a battery controller 104, a monitor 106, a power distribution unit 108, a hardware device 110, a communication interface 112, a device driver 114, an operating system 116 and a management agent 118.

The battery 102 may be implemented using, e.g., an Uninterruptible Power Supply (UPS), and is controlled by the battery controller 104. When the power of the first node 100/1 increases up to a preset power capping threshold, the battery 102 is operated for a certain period of time until the power value meet under threshold according to the degree of availability of the first node 100/1, e.g., the power management information and the performance information of the first node, thereby decreasing the power of the first node 100/1.

The monitor 106 functions to monitor power and battery information, and the Power Distribution Unit (PDU) 108 functions to distribute input power, e.g., Alternating Current (AC) power, and supply the distributed power to the first node 100/1. The hardware device 110 is controlled by the device driver 114 when, e.g., ACPI is supported. The Operating System (OS) 116 provides an environment enabling the device driver 114 or the like to be controlled at a user level.

The management agent 118 functions to gather and control information and to transmit both power management information obtained through the information gathering and control by the management agent 118, e.g., information about the battery and power of the first node 100/1, and the performance information of the first node 100/1, e.g., information about availability calculated using the amount of use of a processor, the amount of use of memory, and the amount of use of a network, to the network 200 through a communication interface 112, e.g., an Ethernet interface.

Further, the network 200 of FIG. 1 functions to transfer the power management information of a certain node of the cluster 100, e.g., the first node 100/1, e.g., the capacity of the battery and the amount of power of the first node 100/1, and the performance information of the first node 100/1, e.g., information about availability calculated using the amount of use of a processor, the amount of use of memory, and the amount of use of a network, to the power control unit 300.

Further, the network 200 functions to transfer a power cap value determined by the power determination unit 310, e.g., a reference value required for a dynamic operation for power limitation, i.e., power capping, to the certain node of the cluster 100, e.g., the first node 100/1.

The power control unit 300 includes a monitoring unit 302, a history Database (DB) 304, an analysis unit 306, an optimization unit 308 and a power determination unit 310.

The monitoring unit 302 functions to monitor information transferred via the network 200, in detail, the power management information of the certain node of the cluster 100, e.g., the first node 100/1, such as the information about the battery and power of the first node 100/1, and the performance information of the first node 100/1, such as the information about availability calculated using the amount of use of a processor, the amount of use of memory and the amount of use of a network.

The history DB 304 temporarily stores the power management information and the performance information of the certain node, e.g., the first node 100/1, which are monitored by the monitoring unit 302.

The analysis unit 306 functions to analyze the power management information and the performance information of the certain node, e.g., the first node 100/1, temporarily stored in the history DB 304. Here, the amount of analysis performed by the analysis unit 306 corresponds to the statistical information of time and load, and can be used as reference data for real-time power control.

The optimization unit 308 functions to optimize the power management information and the performance information, analyzed by the analysis unit 306, and to transfer the optimized information to the power determination unit 310.

The power determination unit 310 determines a power cap value on the basis of the optimized monitored power, performance information and performance history information, which are transferred by the optimization unit 308. The power cap value determined in this way can be transferred to the certain node of the cluster 100, which has been initially monitored, e.g., the first node 100/1, over the network 200.

The user terminal 400 is connected to the power control unit 300 and is configured to provide the results of the analysis of the power management information and the performance information by the analysis unit 306, or to directly input specific data, set by the user, to the power determination unit 310.

Hereinafter, a power control method for a cluster system in accordance with an embodiment of the present invention will be described in detail with reference to the flowcharts of FIGS. 3 to 5A-5B, together with the above-described construction.

Figure 3:
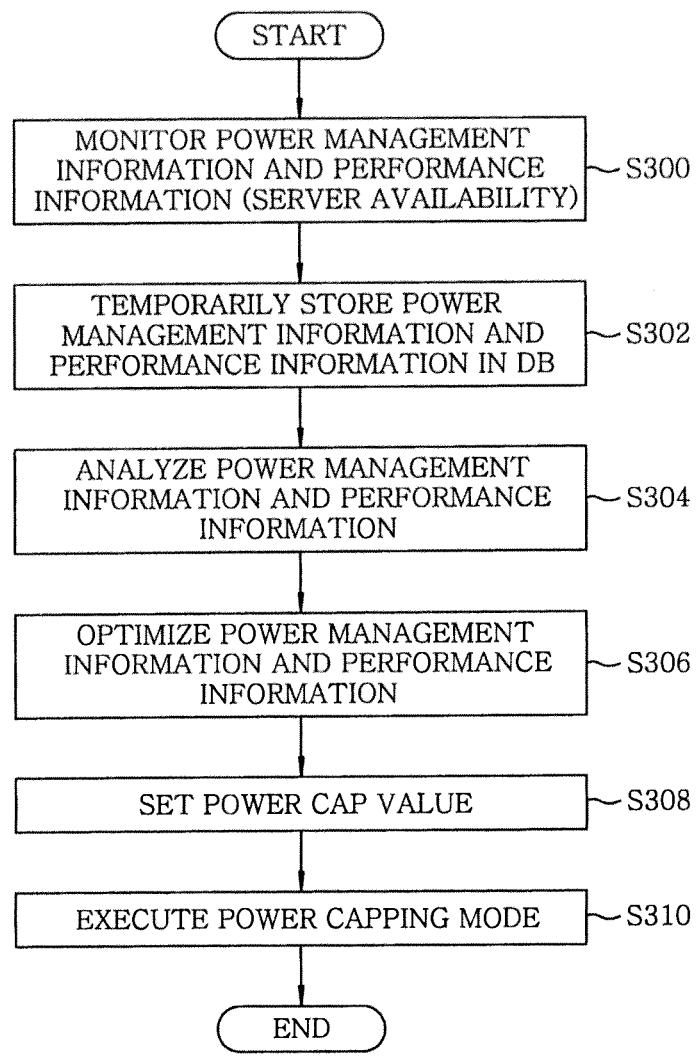
FIG. 3 is a flow chart showing a power control method for a cluster system, in detail, a power control process using real-time dynamic control in accordance with the embodiment of the present invention.

FIG. 3 is a flow chart showing a power control method for a cluster system in accordance with the embodiment of the present invention, that is, a power control process using real-time dynamic control.

As shown in FIG. 3, the power management information and the performance information (i.e., the availability of a server) of a certain node of the cluster 100, e.g., the first node 100/1, are monitored by the monitoring unit 302 of the power control unit 300 in step S300.

Thereafter, the power control unit 300 temporarily stores the power management information and the performance information of the first node 100/1, monitored by the monitoring unit 302, in the history DB 304 in step S302.

The power management information and the performance information of the first node 100/1, temporarily stored in the history DB 304, can be analyzed by the analysis unit 306 in step S304. For example, the power management information and the performance information can be analyzed according to the statistical information of time and load.

Thereafter, the power control unit 300 optimizes the power management information and the performance information of the first node 100/1, analyzed by the analysis unit 306, in step S306, and provides the results of the optimization to the power determination unit 310 to enable a power cap value to be determined in step S308.

A procedure for determining the power cap value includes setting the maximum power capping threshold and the minimum power capping threshold for the system, separately setting an operating power cap value (driving point) that enables an operation in a capping range between the maximum power capping threshold and the minimum power capping threshold for the system, and increasing the operating power cap value up to a preset power capping threshold when the cluster system executes power capping mode above the operating power cap value, but the power of the cluster system cannot be decreased below the power capping threshold due to the load of the cluster system.

When the power cap value is determined, the power capping mode in accordance with an embodiment of the present invention is executed in step S310. Such a power capping mode execution procedure will be described in detail with reference to FIG. 4.

Figure 4A:
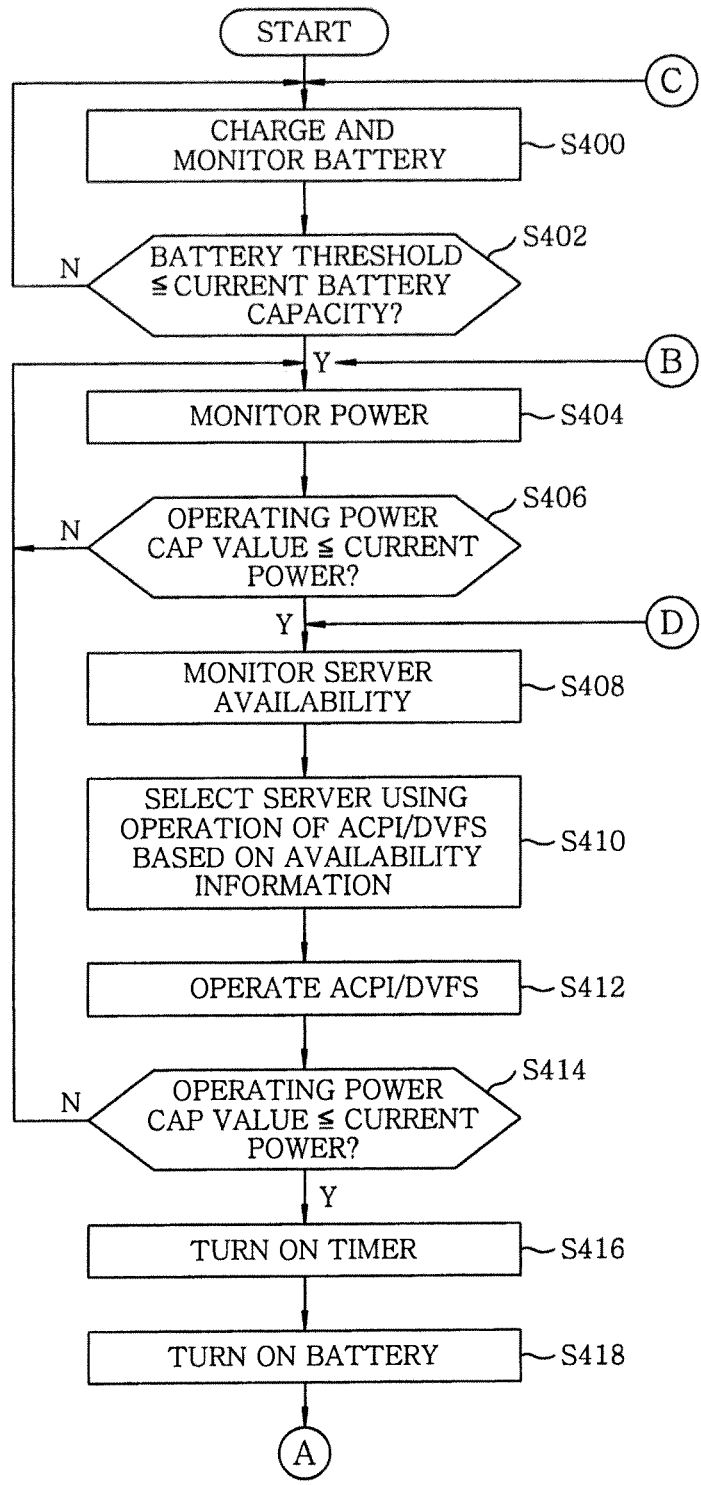
FIGS. 4A and 4B are detailed flow charts showing the power capping mode execution procedure of FIG. 3.
Figure 4B:
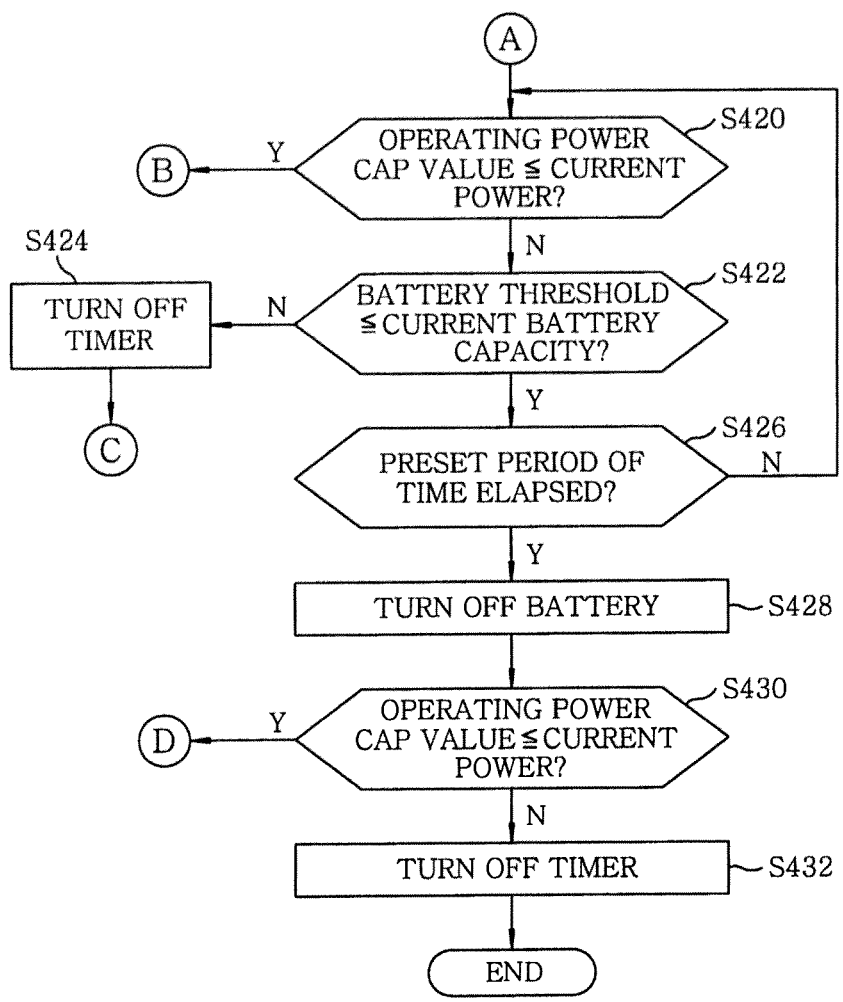

FIG. 4 is a flow chart showing the power capping mode execution procedure of FIG. 3. First, the power control unit 300 charges the battery 100 of the first node 100/1 and monitors the capacity of the battery using the monitoring unit 302 in step S400. The monitoring of the battery capacity of the first node 100/1 can be implemented by the management agent 118 and the communication interface 112 of the first node 100/1 and the network 200.

As a result of the monitoring of the battery capacity, when the current capacity of the battery is not less than a preset battery threshold at step S402, the power management information and the performance information of the first node 100/1 are monitored to execute the above-described power capping mode in step S404. Whether the current power of the first node 100/1 is not less than the operating power cap value (driving point), determined by the power determination unit 310 in step S308, is determined in step S406.

If it is determined in step S406 that the current power of the first node 100/1 is not less than the operating power cap value, the server availability of the first node 100/1 is monitored in step S408.

The first node 100/1 is selected based on information obtained by such monitoring, and thus the state of the ACPI can be changed, or the Dynamic Voltage and Frequency Scaling (DVFS) can be operated, in steps S410 and S412.

In step S414, whether the current power is not less than the operating power cap value is determined again. If it is determined that the current power is not less than the operating power cap value, a timer is turned on in step S416 and the battery of the first node 100/1 is turned on for a preset period of time in step S418.

After the power capping mode is executed for the preset period of time, whether the current power is not less than the operating power cap value is determined in step S420. If it is determined in step S420 that the current power amount is not less than the operating power cap value, the process returns to step S404.

Thereafter, the current capacity of the battery is compared with the preset battery threshold for a preset period of time in step S422. If the current capacity of the battery is less than the preset battery threshold, the timer is turned off in step S424 and the process goes to step S400. Meanwhile, if the current capacity of the battery is not less than the preset battery threshold, and the preset period of time has elapsed in step S426, the battery is turned off in step S428.

Thereafter, whether the current power amount is not less than the operating power cap value is determined again in step S430. If it is determined in step S430 that the current power is not less than the operating power cap value, the process returns to step S408, and if it is determined in step S430 that the current power is less than the operating power cap value, the timer is turned off in step S432 and the process is terminated.

Figure 5A:
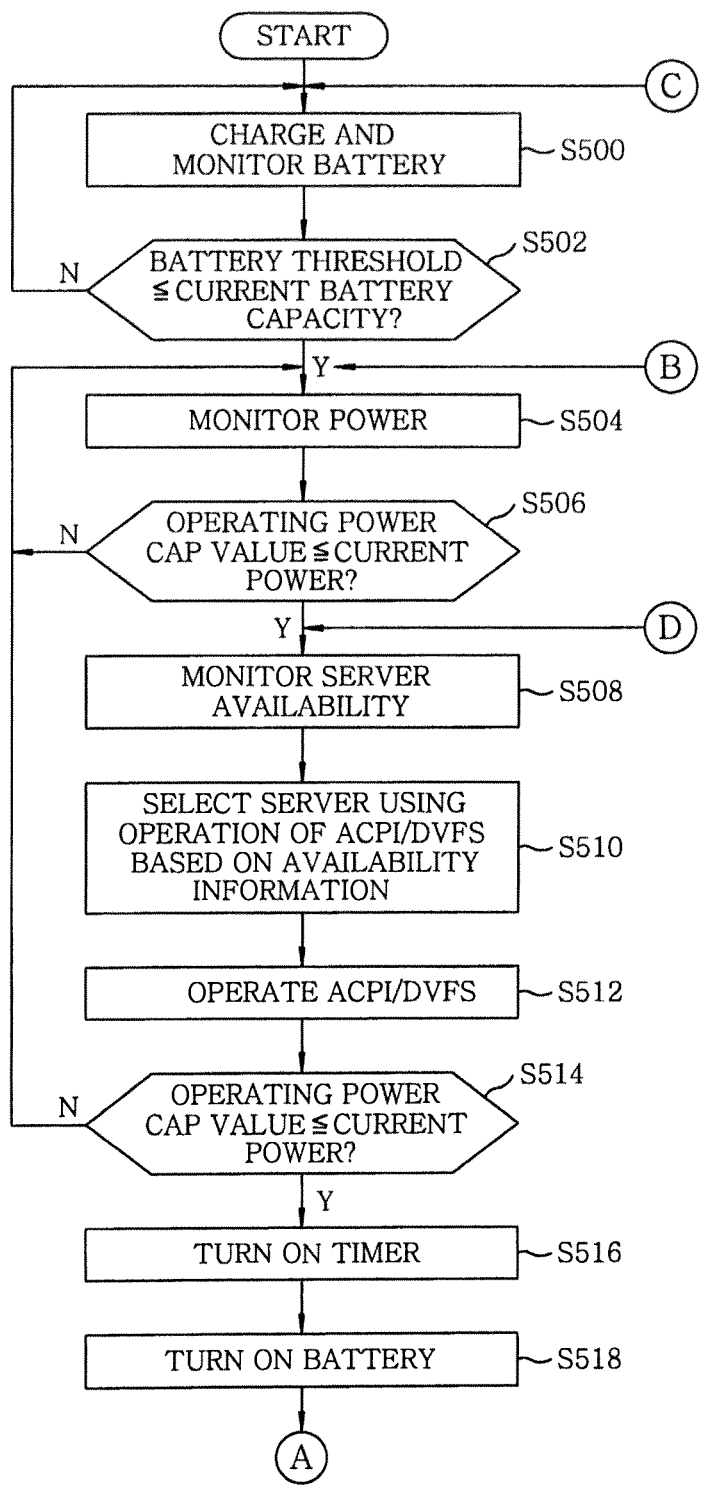
FIGS. 5A and 5B are flow charts showing an example of a power control process using a direct input of user in the power control method for a cluster system in accordance with the embodiment of the present invention.
Figure 5B:
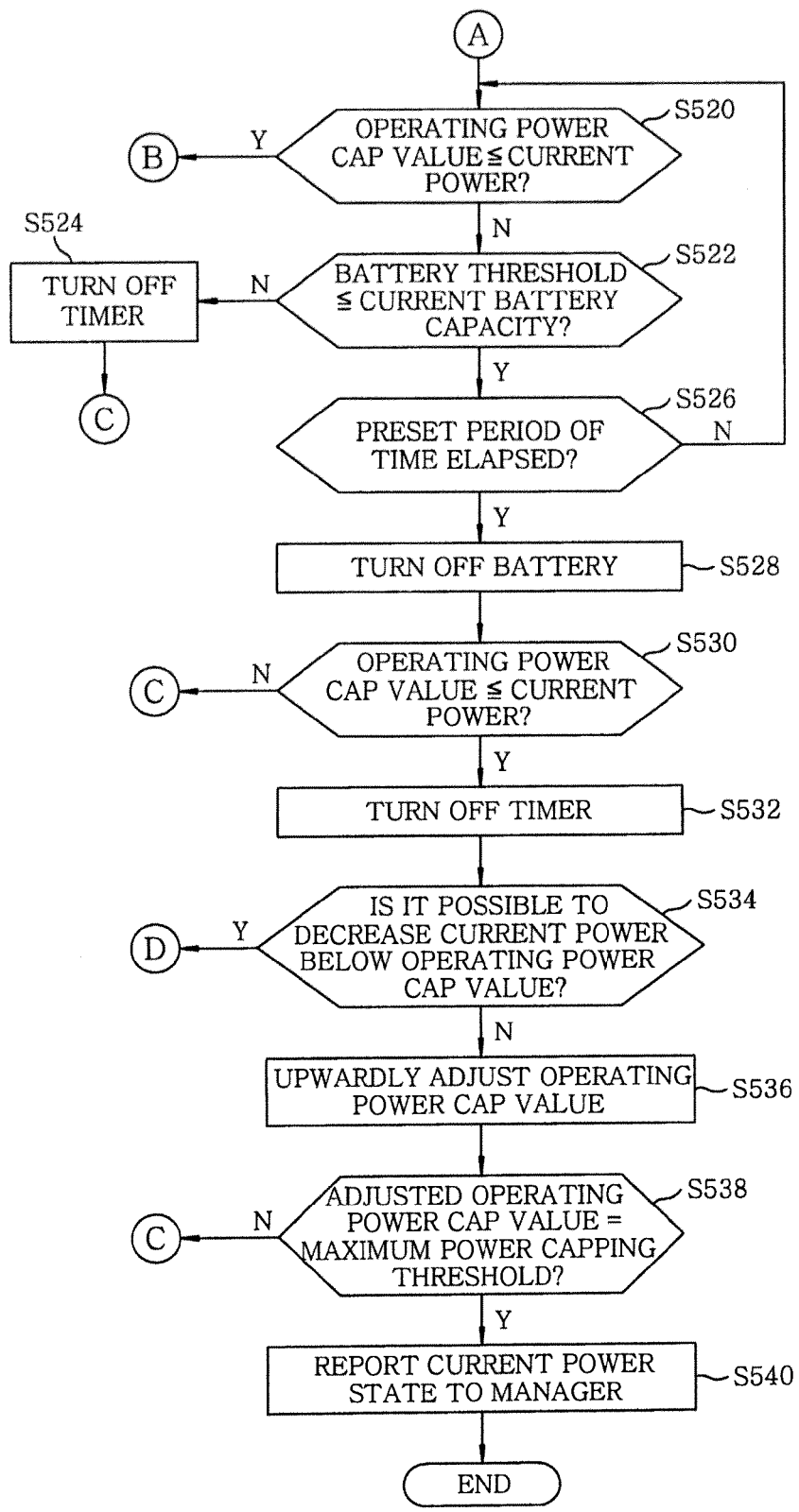

Meanwhile, FIGS. 5A and 5B are flow charts showing another example of a power control process using a direct input of user in the power control method for a cluster system in accordance with an embodiment of the present embodiment.

As shown in FIGS. 5A-5B, the power control unit 300 charges the battery 100 of the first node 100/1 and monitors the capacity of the battery 100 using the monitoring unit 302 in step S500. The monitoring of the capacity of the battery of the first node 100/1 can be implemented using the management agent 118 and the communication interface 112 of the first node 100/1 and the network 200.

As a result of the monitoring of the battery capacity, when the current capacity of the battery is not less than a preset battery threshold in step S502, the power management information and the performance information of the first node 100/1 are monitored to execute the above-described power capping mode in step S504. Whether the current power of the first node 100/1 is not less than the operating power cap value (driving point), determined by the power determination unit 310 in step S308, is determined in step S506.

If it is determined in step S506 that the current power of the first node 100/1 is not less than the operating power cap value, the server availability of the first node 100/1 is monitored in step S508.

The first node 100/1 is selected based on information obtained by such monitoring, and thus the state of the ACPI can be changed, or the Dynamic Voltage and Frequency Scaling (DVFS) can be operated, in steps S510 and S512.

In step S514, whether the current power is not less than the operating power cap value is determined again. If it is determined that the current power is not less than the operating power cap value, the battery of the first node 100/1 is turned on for a preset period of time in steps S516 and S518.

After the power capping mode is executed for the preset period of time, whether the current power is not less than the operating power cap value is determined in step S520. If it is determined in step S520 that the current power amount is not less than the operating power cap value, the process returns to step S504.

Thereafter, the current capacity of the battery is compared with the preset battery threshold for a preset period of time in step S522. If the current capacity of the battery is less than the preset battery threshold, the timer is turned off in step S524 and the process goes to step S500. Meanwhile, if the current capacity of the battery is not less than the preset battery threshold, and the preset period of time has elapsed in step S526, the battery is turned off in step S528.

After the battery is turned off in this way, whether the current power is not less than the operating power cap value is determined in step S530. If it is determined that the current power is not less than the operating power cap value, the timer is turned off in step S532 and then whether the power can be decreased below the operating power cap value is determined in step S534.

If it is determined that the current power can be decreased below the operating power cap value, the process returns to S508, and if it is determined that the current power cannot be decreased below the operating power cap value, the process proceeds to step S536, thus enabling the operating power cap value to be upwardly adjusted.

In step S538, whether the operating power cap value, upwardly adjusted in this way, is identical to the maximum power capping threshold is determined. When the upwardly adjusted operating power cap value is identical to the maximum power capping threshold, a reporting procedure for reporting the current power state to the manager is performed in step S540 and the process is terminated.

In this case, the reporting procedure is a procedure for providing available operating power to the user, and may be a procedure for providing collective statistical information indicating the current power state and the previous power state of the system to the user.

As described above, in accordance with an embodiment of the present invention, a battery can be mounted in the power supply unit of the node (or server) of a cluster system and can be controlled in real time, and when power increases up to a preset power capping threshold, the battery is operated for a preset period of time according to the degree of availability of the server, thus enabling power to be controlled. In this case, the present invention is configured such that, when the availability of the controlled power is low, the state of the server is converted into a sleep state or a hibernation state using the control of an ACPI, thus reducing power consumption, and such that, when the availability of the system is high, instantaneous power is interrupted using a battery to enable the battery to be operated for a preset period of time.

While the invention has been shown and described with respect to the embodiments, it will be understood by those skilled in the art that various changes and modifications may be made without departing from the scope of the invention as defined in the following claims.

What is claimed is:

1. A power control apparatus for a cluster system, comprising:
    a cluster including a plurality of nodes, each equipped with a battery; and
    a power control unit connected to the cluster over a network and configured to monitor power management information and performance information of the cluster and to set a power capping threshold based on the monitored power management information and performance information of the cluster, thus enabling power of the cluster to be limited by turning on and off the batteries when power of the cluster system increases up to the power capping threshold,
    wherein each node of the cluster is connected to a power supply unit separate from the battery and the power of the cluster is supplied by the separate power supply unit or the battery,
    wherein the determining the power cap value comprises: setting a maximum power capping threshold and a minimum power capping threshold for the cluster system and separately setting an operating power cap value (driving point) that enables an operation to be performed between the maximum power capping threshold and the minimum power capping threshold; and
    increasing the operating power cap value up to a preset power capping threshold when the cluster system executes the power capping mode above the operating power cap value, but the power of the cluster system cannot be decreased below the power capping threshold due to a load of the cluster system.

2. The power control apparatus of claim 1, wherein each of the plurality of nodes comprises:
    a battery controller configured to control an on/off operation of the battery; a hardware device controlled by a device driver; and a management agent configured to perform a function of gathering information about the battery and a function of controlling the hardware device, and to transfer the power management information and the performance information, obtained by the information gathering function and the hardware control function, to the power control unit.

3. The power control apparatus of claim 1, wherein each of the batteries is an Uninterruptible Power Supply (UPS).

4. The power control apparatus of claim 2, wherein the battery is configured such that, when power of its corresponding node increases up to the power capping threshold, the battery is operated for a preset period of time according to a degree of availability of the corresponding node, thus decreasing the power of the corresponding node.

5. The power control apparatus of claim 1, wherein the power control unit comprises:
    a monitoring unit for monitoring the power management information and the performance information of the cluster, which are transferred over the network;
    a history database for temporarily storing the power management information and the performance information of the cluster, which are monitored by the monitoring unit;
    an analysis unit for analyzing the power management information and the performance information of the cluster, which are temporarily stored in the history database;
    an optimization unit for optimizing the power management information and the performance information of the cluster, which are analyzed by the analysis unit; and
    a power determination unit for setting a power cap value based on the power management information and the performance information of the cluster, which are optimized by the optimization unit.

6. The power control apparatus of claim 5, wherein the performance information of the cluster is information about availability of the cluster calculated using all amount of use of a processor of each node of the cluster, an amount of use of memory, an amount of use of a network, and an amount of use of a hard disc.

7. The power control apparatus of claim 5, wherein the power determination unit provides and sets the power cap value based on monitored power and performance history information of the cluster.

8. The power control apparatus of claim 5, wherein the power determination unit controls a function of the battery of the certain node of the cluster for a preset period of time, thus decreasing the power of the certain node.

9. The power control apparatus of any one of claims 1 to 8, wherein the cluster system is at least one data center.

10. The power control apparatus of any one of claims 1 to 8,
    wherein the cluster system is at least one computing system.

11. A power control method for a cluster system, comprising:
    monitoring power management information and performance information of a cluster over a network, wherein the cluster includes a plurality of nodes, wherein each node includes a battery and is connected to a power supply unit separate from the battery;
    arranging the monitored power management information and performance information of the cluster into a database;
    analyzing and optimizing the power management information and the performance information of the cluster, which are arranged into the database;

determining a power cap value of the cluster based on results of the analysis and optimization; and executing power capping mode for the cluster according to the determined power cap value,
wherein power of each node is supplied by the battery or the separate power supply unit, wherein the determining the power cap value comprises:

setting a maximum power capping threshold and a minimum power capping threshold for the cluster system and separately setting an operating power cap value (driving point) that enables an operation to be performed between the maximum power capping threshold and the minimum power capping threshold; and increasing the operating power cap value up to a preset power capping threshold when the cluster system executes the power capping mode above the operating power cap value, but the power of the cluster system cannot be decreased below the power capping threshold due to a load of the cluster system.

12. The power control method of claim 11, wherein the executing
the power capping mode comprises: charging a battery at least one of said nodes and monitoring a capacity of the battery;

when the monitored capacity of the battery is not less than a preset battery threshold, monitoring power management information and performance information of the at least one of said nodes to execute the power capping mode;

determining whether a current power of the at least one of said nodes is greater than an operating power cap value;

if it is determined that the current power of the at least one of said nodes is greater than the operating power cap value, monitoring server availability of the node;

selecting the at least one of said nodes using information obtained in monitoring the server availability of the node, and changing a state of an Advanced Configuration and Power Interface (ACPI) or operating Dynamic Voltage and Frequency Scaling (DVFS);

determining whether the current power of the at least one of said nodes is greater than the operating power cap value, and turning on the battery of the at least one of said nodes for a preset period of time if it is determined that the current power is greater than the operating power cap value;

after the power capping mode has been executed for the preset period of time, determining whether the current power is greater than the operating power cap value, and returning to monitoring the power management information and the performance information of the at least one of said nodes if it is determined that the current power is not less than the operating power cap value; and comparing the current capacity of the battery with the preset battery threshold for the preset period of time, and turning off the battery when the current capacity of the battery is less than the preset battery threshold.

13. The power control method of claim 12, wherein the executing the power capping mode comprises:

if the current power is not less than the operating power cap value after the battery is turned off, determining whether the power can be decreased below the operating power cap value;

if it is determined that the power cannot be decreased below the operating power cap value, upwardly adjusting the operating power cap value;

determining whether the upwardly adjusted operating power cap value is identical to a maximum power capping threshold; and reporting a current power state when the upwardly adjusted operating power cap value reaches the maximum power capping threshold.

14. The power control method of claim 13, wherein the reporting the current power state is performed to provide a user with currently available operating power, and collective statistical information indicating a current power state and a previous power state of the cluster system.

15. The power control method of claim 12 or 13, wherein the battery is an Uninterruptible Power Supply (UPS).

16. The power control method of claim 12 or 13, wherein the
battery is configured such that, when power of the at least one of said nodes increases up to a preset power capping threshold, the battery is operated for a preset period of time according to a degree of availability of the at least one of said nodes, thus decreasing the power of the at least one of said nodes.

17. The power control method of any one of claims 11 to 14,
wherein the cluster system is at least one data center.

18. The power control method of any one of claims 11 to 14,
wherein the cluster system is at least one computing system.

* * * * *